United States Patent
Han et al.

(10) Patent No.: US 10,412,683 B2
(45) Date of Patent: *Sep. 10, 2019

(54) POWER CONTROL METHOD, ACTIVATION MANAGEMENT METHOD, USER EQUIPMENT, AND BASE STATION

(71) Applicant: HUAWEI TECHNOLOGIES CO., LTD., Shenzhen, Guangdong (CN)

(72) Inventors: Guanglin Han, Beijing (CN); Jianqin Liu, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/193,551

(22) Filed: Jun. 27, 2016

(65) Prior Publication Data

US 2016/0309417 A1  Oct. 20, 2016

Related U.S. Application Data

(63) Continuation of application No. 14/192,226, filed on Feb. 27, 2014, now Pat. No. 9,408,163, which is a
(Continued)

(30) Foreign Application Priority Data

Aug. 30, 2011  (CN) .......................... 2011 1 0253148

(51) Int. Cl.
*H04W 52/14* (2009.01)
*H04W 52/50* (2009.01)
(Continued)

(52) U.S. Cl.
CPC ..... *H04W 52/146* (2013.01); *H04W 52/0206* (2013.01); *H04W 52/36* (2013.01);
(Continued)

(58) Field of Classification Search
CPC .... H04L 5/0053; H04W 52/02; H04W 52/14; H04W 52/36; H04W 52/50; H04W 72/04;
(Continued)

(56) References Cited

U.S. PATENT DOCUMENTS

| 2011/0026422 | A1 | 2/2011 | Ma et al. |
| 2012/0106478 | A1* | 5/2012 | Han ...................... H04L 5/0053 370/329 |
| 2013/0250902 | A1 | 9/2013 | Xu et al. |

FOREIGN PATENT DOCUMENTS

| CN | 101902810 | 12/2010 |
| CN | 101998604 | 3/2011 |

(Continued)

OTHER PUBLICATIONS

"3rd Generation Partnership Project; Technical Specification Group Radio Access Network; Evolved Universal Terrestrial Radio Access (E-UTRA); Medium Access Control (MAC) protocol specification (Release 10)", 3GPP TS 36.321 V10.2.0, Jun. 2011, pp. 1-54.
(Continued)

*Primary Examiner* — Zhiren Qin
*Assistant Examiner* — Leon Andrews
(74) *Attorney, Agent, or Firm* — Staas & Halsey LLP

(57) ABSTRACT

An embodiment of the present invention discloses a power control method, including: obtaining, by a UE, configuration information, where the configuration information includes a configuration parameter of at least one Scell configured by a base station for the UE; setting, by the UE, an initial power adjustment value of the Scell according to the configuration parameter of the Scell in the configuration information; and controlling, by the UE, transmit power on the Scell according to the set initial power adjustment value of the Scell. Correspondingly, an embodiment of the present invention further discloses an activation management method, a UE, and a base station. By using the present invention, transmit
(Continued)

power of a UE on an Scell can be accurately controlled, thereby ensuring accuracy of data transmission.

7 Claims, 7 Drawing Sheets

Related U.S. Application Data continuation of application No. PCT/CN2012/080787, filed on Aug. 30, 2012.

(51) Int. Cl.
  *H04W 52/36* (2009.01)
  *H04W 52/02* (2009.01)
  *H04W 72/04* (2009.01)
  *H04W 74/08* (2009.01)
  *H04W 52/34* (2009.01)
  *H04W 84/04* (2009.01)

(52) U.S. Cl.
  CPC ......... *H04W 52/50* (2013.01); *H04W 72/042* (2013.01); *H04W 72/0413* (2013.01); *H04W 72/0473* (2013.01); *H04W 74/0833* (2013.01); *H04W 52/34* (2013.01); *H04W 84/042* (2013.01); *Y02D 70/1242* (2018.01); *Y02D 70/1262* (2018.01); *Y02D 70/1264* (2018.01)

(58) Field of Classification Search
  CPC .. H04W 74/08; H04W 52/146; H04W 72/042
  See application file for complete search history.

(56) References Cited

FOREIGN PATENT DOCUMENTS

| CN | 102036411 | 4/2011 |
|---|---|---|
| CN | 102065455 | 5/2011 |
| CN | 102131275 | 7/2011 |

OTHER PUBLICATIONS

Notice of Allowance, dated Mar. 29, 2016, in U.S. Appl. No. 14/192,226.
Office Action, dated Oct. 21, 2015, in U.S. Appl. No. 14/192,226.
Extended European Search Report dated Apr. 15, 2014 in corresponding European Patent Application No. 12828306.6.
PCT International Search Report and Written Opinion of the International Searching Authority dated Dec. 13, 2012 in corresponding International Patent Application No. PCT/CN2012/080787.
"Common information for Scell configuration", LG Electronics Inc., 3GPP TSG-RAN2 Meeting #70bis, Sweden, Jun. 28-Jul. 2, 2010, pp. 1-5.
"Cross Carrier Scheduling of RACH on SCell", ASUSTeK, 3GPP TSG-RAN2 Meeting #75, Greece, Aug. 2011, 4pp.
"RACH Procedure for SCell TA", InterDigital Communications, 3GPP TSG-RAN WG2 #75, Greece, Aug. 2011, pp. 1-4.
"Remaining issues related to CA during random access procedure in LTE-A", ZTE, 3GPP TSG-RAN WG1 #65, Spain, May 2011, 2pp.
"Power limitation on DPCCH of secondary carrier", Huawei, 3GPP TSG RAN WG1 Meeting #58, China, Aug. 2009, 3pp.
"$3^{rd}$ Generation Partnership Project; Technical Specification Group Radio Access Network; Evolved Universal Terrestrial Radio Access (E-UTRA); Physical layer procedures (Release 10)", 3GPP TS 36.213 V10.2.0, Jun. 2011, pp. 1-120.
"$3^{rd}$ Generation Partnership Project; Technical Specification Group Radio Access Network; Evolved Universal Terrestrial Radio Access (E-UTRA); Radio Resource Control (RRC); Protocol specification (Release 10)", 3GPP TS 36.331 V10.2.0, Jun. 2011, pp.
U.S. Appl. No. 14/192,226, filed Feb. 27, 2014, Guanglin Han et al., Huawei Technologies Co., Ltd.
Chinese Office Action dated Jan. 2, 2018 in corresponding Chinese Patent Application No. 201510448246.X, 5 pp.

\* cited by examiner

POWER CONTROL METHOD, ACTIVATION MANAGEMENT METHOD, USER EQUIPMENT, AND BASE STATION

CROSS-REFERENCE TO RELATED APPLICATION

This application is a continuation of U.S. patent application Ser. No. 14/192,226, which is now U.S. Pat. No. 9,408,163 B2, filed on Feb. 27, 2014, which is a continuation of International Application No. PCT/CN2012/080787, filed on Aug. 30, 2012, which claims priority to Chinese Patent Application No. 201110253148.2, filed on Aug. 30, 2011. The afore-mentioned patent applications are hereby incorporated by reference in their entireties.

TECHNICAL FIELD

The present invention relates to the field of radio communications technologies, and in particular, to a power control method, an activation management method, a UE (User Equipment, user equipment), and a base station.

BACKGROUND

In order to satisfy requirements of users of radio cellular mobile networks for higher speed, broader coverage, and larger capacity, radio cellular mobile networks are evolving from the 3G (3rd-generation, third generation mobile communication technologies) technologies to the LTE (Long Term Evolution, long term evolution) technology, and further to the LTE-Advanced (LTE-Advanced) technology.

The LTE technology supports fast scheduling and link adaptation technology for both uplink and downlink, and can allocate time-and-frequency resources according to an instantaneous requirement and a channel state of a user. In an uplink scheduling technology, because LTE can divide a frequency domain into a plurality of segments, LTE can schedule resources for multiple UEs simultaneously at a same subframe (subframe). In general, in order to extend a battery life of a UE and reduce intra-cell (Intra-cell) interference and inter-cell (Inter-cell) interference, transmit power of the UE should be not overused. In an LTE system, an eNodeB (evolved NodeB, evolved base station) is used to perform power control on UEs to achieve the above objective. The eNodeB adjusts the transmit power of a UE by sending a TPC Command (Transmission Power Control Command, transmit power control command). Based on the TPC Command sent by the eNodeB, the UE may adjust uplink transmit power in the following two modes: an accumulation (accumulation) mode and an absolute (absolute) mode. In the accumulation mode, the UE accumulates a value corresponding to each TPC (Transmission Power Control, transmit power control) received from the eNodeB, where an accumulative result is used to adjust the uplink transmit power. In the absolute mode, the UE directly uses a value corresponding to each TPC received from the eNodeB to adjust the uplink transmit power.

No matter whether in the accumulation mode or the absolute mode, the UE needs to set a PUSCH (Physical Uplink Control Channel, uplink data channel) initial power adjustment value $f_c(0)$ of and/or a PUCCH (Physical Uplink Shared Channel, uplink control channel) initial power adjustment value $g_c(0)$, and then obtains transmit power values based on PUSCH and PUCCH transmit power calculation formulas to set the uplink transmit power, thereby achieving power control. In the prior art, the setting of the initial power adjustment value depends on a type of a carrier configured by the eNodeB. If a carrier to be adjusted is a Pcell (Primary Carrier, primary carrier), using a PUSCH channel as an example, the UE sets the PUSCH channel initial power adjustment value of the Pcell to $f_c(0)=\Delta P_{rampup}+\delta_{msg2}$, where $\delta_{msg2}$ is a power adjustment value represented by the TPC Command received by the UE, and $\Delta P_{rampup}$ is a total power ramping value of the UE in an RA (Random Access, random access) process. For another Scell (Secondary Carrier, secondary carrier), the UE sets the PUSCH channel initial power adjustment value of the Scell to 0. Based on the initial power adjustment values set above, the eNodeB sends the TPC Command of the Scell to the UE by adopting power control which is the same as that for the Pcell channel based on adjustment of an uplink transmit power of the Pcell channel, to adjust uplink transmit power of the Scell channel, thereby achieving power control over the Scell channel. The eNodeB performs power control over the PUCCH channel of the Pcell and the Scell in a similar way.

The above solution in the prior art is only applicable to a situation where a difference between channel states of the Pcell and the Scell is small. However, in some scenarios, a difference between the channel states of the Pcell and the Scell may be large. For example, in an inter-band (Inter-Band) carrier aggregation scenario, a difference between PLs (Path Loss, path loss) of channels of the Pcell and the Scell is large. In this situation, if the initial power adjustment value of the Scell is still set to 0 according to the prior art, and on this basis, the eNodeB cannot accurately send a proper TPC Command to the Scell according to adjustment of the uplink transmit power of the Pcell channel to adjust the uplink transmit power of the Scell, which results in that the uplink transmit power of the UE on the Scell is excessively large or excessively small. If the uplink transmit power of the UE on the Scell is excessively large, power consumption of the UE is increased, and interference to surrounding UEs is also increased. If the uplink transmit power of the UE on the Scell is excessively small, a signal sent by the UE cannot be accurately parsed by the eNodeB, resulting in an extra data transmission delay, thereby wasting air interface resources. In view of the above, in a situation where the difference between the channel states of the Pcell and the Scell is large, how to perform appropriate power control over the Scell channel to enable the uplink transmit power of the UE on the Scell to have a proper value becomes an issue to be settled urgently.

SUMMARY

Embodiments of the present invention provide a power control method, an activation management method, a UE and a base station, which can accurately control transmit power of a UE on an Scell, and ensure accuracy of data transmission.

According to one aspect, an embodiment of the present invention provides a power control method, which includes:

obtaining, by a UE, configuration information, where the configuration information includes a configuration parameter of at least one Scell configured by a base station for the UE;

setting, by the UE, an initial power adjustment value of the Scell according to the configuration parameter of the Scell in the configuration information; and controlling, by the UE, transmit power on the Scell according to the set initial power adjustment value of the Scell.

According to another aspect, an embodiment of the present invention further provides another power control method, which includes:

configuring, by a base station, at least one Scell for a UE that is connected to the base station; and delivering, by the base station, configuration information to the UE, where the configuration information includes a configuration parameter of the at least one Scell configured by the base station, so that the UE sets an initial power adjustment value of the Scell according to the configuration parameter of the at least one Scell.

According to another aspect, an embodiment of the present invention further provides an activation management method, which includes:

configuring, by a base station, at least one Scell for a UE that is connected to the base station, and delivering configuration information to the UE, where the configuration information includes a configuration parameter of the at least one Scell; and performing, by the base station, activation management for the at least one Scell.

According to another aspect, an embodiment of the present invention further provides another activation management method, which includes:

obtaining, by a UE, configuration information, where the configuration information includes a configuration parameter of at least one Scell configured by a base station for the UE; and performing, by the UE, activation processing for the at least one Scell according to an activation management command delivered by the base station.

According to another aspect, an embodiment of the present invention further provides a UE, which includes:

an obtaining module, adapted to obtain configuration information, where the configuration information includes a configuration parameter of at least one Scell configured by a base station for the UE;

a setting module, adapted to set an initial power adjustment value of the Scell according to the configuration parameter of the Scell in the configuration information obtained by the obtaining module; and a control module, adapted to control transmit power of the UE on the Scell according to the initial power adjustment value of the Scell set by the setting module.

According to another aspect, an embodiment of the present invention further provides another UE, which includes:

an obtaining module, adapted to obtain configuration information, where the configuration information includes a configuration parameter of at least one Scell configured by a base station for the UE; and an activation processing module, adapted to perform activation processing for the at least one Scell according to an activation management command delivered by the base station.

According to another aspect, an embodiment of the present invention further provides a base station, which includes:

a configuration module, adapted to configure at least one Scell for a UE that is connected to the base station; and a sending module, adapted to deliver configuration information to the UE, where the configuration information includes a configuration parameter of the at least one Scell configured by the configuration module, so that the UE sets an initial power adjustment value of the Scell according to the configuration parameter of the at least one Scell.

According to another aspect, an embodiment of the present invention further provides another base station, which includes:

a configuration module, adapted to configure at least one Scell for a UE that is connected to the base station;

a sending module, adapted to deliver configuration information to the UE, where the configuration information includes a configuration parameter of the at least one Scell configured by the configuration module; and an activation management module, adapted to perform activation management for the at least one Scell.

The embodiments of the present invention have the following beneficial effects:

The UE in the embodiments of the present invention sets an initial power adjustment value of an Scell according to configuration information delivered by a base station, and controls transmit power of the UE on the Scell according to the set initial power adjustment value of the Scell. Because the initial power adjustment value of the Scell is set based on the configuration parameter directly delivered by the base station instead of being simply set to 0, the UE can still obtain appropriate transmit power even in a situation where a difference between channel states of a Pcell and an Scell is large, thereby ensuring accuracy of data transmission.

BRIEF DESCRIPTION OF DRAWINGS

To describe the technical solutions in the embodiments of the present invention or in the prior art more clearly, the following briefly introduces the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

Figure 1:
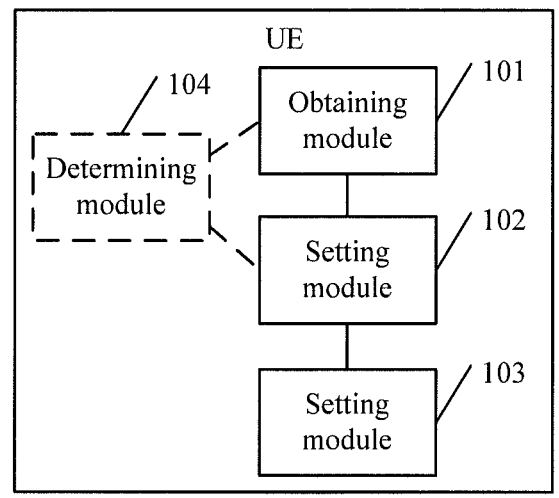
FIG. 1 is a schematic structural diagram of an embodiment of a UE according to the present invention.

The following clearly and completely describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

In the solution provided by the embodiments of the present invention, a UE obtains configuration information delivered by a base station, sets an initial power adjustment value of the Scell according to a configuration parameter of at least one Scell set by the base station for the UE in the configuration information, and controls transmit power of the UE on the Scell according to the set initial power adjustment value of the Scell. Because the initial power adjustment value of the Scell is set based on the configuration parameter directly delivered by the base station instead of being simply set to 0, the UE can still obtain appropriate transmit power even in a situation where a difference between channel states of a Pcell and an Scell is large, thereby ensuring accuracy of data transmission.

The Pcell may be called a primary carrier (Primary Carrier), and may also be called a primary cell (Primary Cell); and the Scell may be called a secondary carrier (Secondary Carrier), and may also be called a secondary cell (Secondary Cell). One Scell may include an uplink carrier and/or a downlink carrier, and the uplink carrier of the Scell may include a PUSCH and/or a PUCCH. A PUSCH initial power adjustment value can be expressed by $f_c(0)$, and a PUCCH initial power adjustment value can be expressed by $g_c(0)$.

The configuration information may include a configuration parameter of the at least one Scell configured by the base station for the UE. The at least one Scell configured by the base station for the UE may include an SRCell and an SOCell. The SRCell is an Scell that includes RA configuration information, and may be called a secondary RACH carrier (Secondary RACH Carrier) or called a secondary RACH cell (Secondary RACH Cell). The SOCell is an Scell that includes no RA configuration information, and may be called a secondary ordinary carrier (Secondary Ordinary Carrier), or called a secondary ordinary cell (Secondary Ordinary Cell). A configuration parameter of the SRCell includes RA configuration information, or RA configuration information and a power control parameter. A configuration parameter of the SOCell includes a power control parameter. The power control parameter may include a configuration parameter for uplink power calculation. The RA configuration information of the Scell may include any one or more of PRACH (Physical Random Access Channel, physical random access channel) configuration information, preamble initial received target power, preamble format information, and an RA power ramping step. It should be noted that, power control parameters of the Scell may further include other parameters such as an identity of the Scell and a power control mode (for example, an accumulation (accumulation) mode or an absolute (absolute) mode), in addition to the configuration parameter for uplink power calculation. The identity of the Scell may be an explicit identity. For example, the base station sets an identity of a certain Scell to 1 (the identity can be explicitly configured by the base station for the UE), an identity of a certain Scell to be 2 (the identity can be explicitly configured by the base station for the UE), and the like. The identity of the Scell may also be an implicit identity. For example, based on an eNodeB configuration sequence, an identity of a first configured Scell is 1 (the identity can be implicitly configured by the base station for the UE), an identity of a second configured Scell is 2 (the identity can be implicitly configured by the base station for the UE), and the like.

The configuration information may further include grouping information of the at least one Scell, where the grouping information is used to indicate that the at least one Scell is subordinate to at least one Scell group. The grouping information may include subordinate relationship configuration between the Scells and the Scell group, identity information of the Scell group, and the like. The identity of the Scell group may be an explicit identity, and may also be an implicit identity. Grouping the at least one Scell is executed by the base station. The base station may group Scells of same band information into one Scell group; or group Scells sharing a same timing advance into one Scell group; or group Scells sharing same network configuration information into one Scell group.

It should be noted that, the base station provided by the embodiments of the present invention may be an eNodeB in an LTE system, and may also be a NodeB in a UMTS (Universal Mobile Telecommunications System, universal mobile telecommunications) system. Unless otherwise stated, the following embodiments of the present invention are described by assuming that the base station is an eNodeB.

An embodiment of a UE provided by the present invention will be described in detail hereinafter with reference to FIG. 1 to FIG. 4.

Referring to FIG. 1, FIG. 1 is a schematic structural diagram of an embodiment of a UE according to the present invention. The UE includes an obtaining module 101, a setting module 102, and a control module 103.

The obtaining module 101 is adapted to obtain configuration information.

The obtaining module 101 may obtain the configuration information by parsing a dedicated configuration message, for example, an RRC Connection Reconfiguration (radio resource manage control connection reconfiguration) message, delivered by an eNodeB; or obtain the configuration information by parsing a system message, for example, cell information, carrier information, neighboring cell information, and neighboring carrier information, delivered by the eNodeB; or obtain the configuration information by parsing a dedicated configuration message and a system message that are delivered by the eNodeB. Reference may be made to the prior art for a process where the obtaining module 101 parses the dedicated configuration message and/or the system message, and details will not be described herein again.

The setting module 102 is adapted to set an initial power adjustment value of an Scell according to a configuration parameter of the Scell in the configuration information obtained by the obtaining module 101.

When a difference between channel states of a Pcell and an Scell is large, in order to ensure accuracy of power control over the UE, the setting module 102 needs to set a PUCCH initial power adjustment value $f_c(0)$ and/or a PUCCH initial power adjustment value $g_c(0)$ of the Scell according to the configuration parameter of the Scell in the configuration information obtained by the obtaining module 101. It should be noted that the setting module 102 sets the initial power adjustment value of at least one Scell configured by the eNodeB, which may be interpreted as that the setting module 102 may set initial power adjustment values of all or a part of Scells configured by the eNodeB. In a practical application, the setting module 102 may set, according to an activation management command delivered by the eNodeB, the initial power adjustment value by selecting a corresponding Scell, where the activation management command may include any one or more of an activation command, an RA instruction, a deactivation command, a deactivation timer, and a synchronization timer. For example, if the eNodeB delivers an activation command, to instruct the UE to activate all the Scells configured by the eNodeB for the UE, the setting module 102 may set, according to the activation command, initial power adjustment values of all the Scells configured by the eNodeB. For another example, if the eNodeB delivers an activation command, to instruct the UE to activate a part of the Scells configured by the eNodeB, the setting module 102 may set, according to the activation command, initial power adjustment values of a part of the Scells configured by the eNodeB. For yet another example, if the eNodeB delivers an activation command, to instruct the UE to activate all the Scells configured by the eNodeB for the UE, the setting module 102 may set initial power adjustment values by selecting by itself all or a part of the Scells configured by the eNodeB. For still another example, if the eNodeB delivers an activation command, to instruct the UE to activate a part of the Scells configured by the eNodeB for the UE, the setting module 102 may set initial power adjustment values for all or a part of the Scells, which are configured by the eNodeB and selected by the setting module 102 itself.

The control module 103 is adapted to control transmit power of the UE on the Scell according to the initial power adjustment value of the Scell set by the setting module 102. After the setting module 102 sets the $f_c(0)$ and/or the $g_c(0)$, the control module 103 may substitute the $f_c(0)$ into a PUSCH transmit power calculation formula, to obtain through calculation a PUSCH transmit power value of the UE on the Scell; and substitute the $g_c(0)$ into a PUCCH transmit power calculation formula, to obtain through calculation a PUCCH transmit power value of the UE on the Scell. The control module 103 may set PUSCH and/or PUCCH uplink transmit power of the UE on the Scell based on the transmit power values obtained through calculation, and control uplink data and/or uplink signaling to be transmitted at the transmit power, thereby implementing transmission of data and/or signaling over the air interface.

In this embodiment, optionally, the UE may further include a determining module 104. The determining module 104 may determine whether the UE meets a setting condition after the obtaining module 101 obtains the configuration information. If the UE meets the setting condition, the determining module 104 instructs the setting module 103 to set the initial power adjustment value. That is to say, the setting module 103 is adapted to: when the UE meets the setting condition, set the initial power adjustment value of the Scell according to the configuration parameter of the Scell in the configuration information obtained by the obtaining module 101.

The setting condition may be any one or more of the following conditions: any one Scell in the Scell group is activated, where an Scell being activated includes: a downlink carrier of the Scell and/or an uplink carrier of the Scell is activated; an RA initiated by the UE on any one SRCell in one Scell group is successful; the UE receives a random access response RAR message, where the RAR message is used to respond to the RA initiated by the UE on any one SRCell in one Scell group; and the UE is in an RA process initiated by the UE on any one SRCell in one Scell group before a first message is sent. The first message may be a Msg3 (message 3) message in the RA process, where the Msg3 message is data sent by the UE in response to the RAR message by using resources carried by the RAR message.

Figure 2:
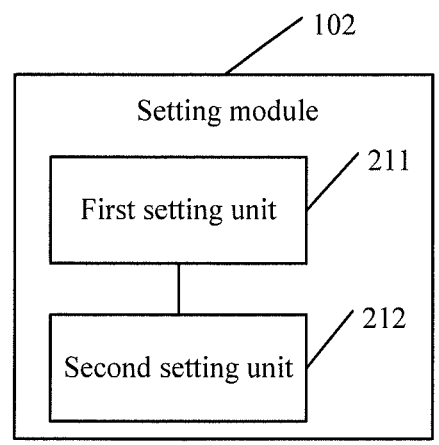
FIG. 2 is a schematic structural diagram of an embodiment of a setting module shown in FIG. 1 according to the present invention.

Referring to FIG. 2, FIG. 2 is a schematic structural diagram of an embodiment of a setting module shown in FIG. 1. In this embodiment, the setting module 102 may include a first setting unit 211 and/or a second setting unit 212.

The first setting unit 211 is adapted to: if the UE initiates an RA on any one SRCell in one Scell group, set a PUSCH initial power adjustment value of the SRCell where the RA is initiated in the Scell group to $f_c(0)=\Delta P_{rampup}+\delta_{msg2}$; and/or set a PUCCH initial power adjustment value of the SRCell where the RA is initiated in the Scell group to) $g_c(0)=\Delta P_{rampup}+\delta_{msg2}$.

$\delta_{msg2}$ is a power adjustment value represented by a TPC Command included in the RAR message received by the UE from the base station in the RA process. $\Delta P_{rampup}$ is a total power ramping value of the UE that is obtained according to the RA configuration information of the SRCell in the RA process. That is to say, $\Delta P_{rampup}$ is a total power ramping value of the UE, from first preamble (Preamble) transmission to last preamble transmission, obtained according to the RA configuration information of the SRCell in the RA process, and may be:

$$\Delta P_{rampup}=\min\{P_{CMAX,c}(i), PRTR+DP+(PTC-1)\times PRS+PL_c\}.$$

PRTR (Preamble Initial Received Target Power, preamble initial received target power) represents received power of a Preamble that the eNodeB expects to receive from the UE. DP (DELTA_Preamble) represents a power adjustment value according to a preamble format sent by the UE, and is used to determine power corresponding to the preamble format. The DP may be obtained from the preamble format information included in the RA information of the SRCell. PTC (Preamble_ Transmission_ represents the number of times that the UE sends the Preamble. PRS (Power Ramping Step, RA power ramping step) represents a power ramping step every time the UE sends the Preamble. $P_{CMAX,c}(i)$ represents configured maximum transmit power of the UE on the current carrier. $PL_c$ represents a path loss.

The second setting unit 212 is adapted to: if the UE initiates an RA on any one SRCell in one Scell group, set a PUSCH initial power adjustment value $f_c(0)$ of an Scell where no RA is initiated in the Scell group to 0; and/or set a PUCCH initial power adjustment value $g_c(0)$ of an Scell where no RA is initiated in the Scell group to 0.

The Scell where no RA is initiated in the Scell group may include an SRCell and an SOCell where no RA is initiated in the Scell group. The setting, by the second setting unit 212, the initial power adjustment value of the Scell where no RA is initiated in the Scell group may be executed concurrently with the setting, by the first setting unit 211, the initial power adjustment value of the SRCell where the RA is initiated in the Scell group, or may be executed after the setting, by the first setting unit 211, the initial power adjustment value of the SRCell where the RA is initiated in the Scell group. In the embodiment of the present invention, the setting module 102 may only include either unit of the first setting unit 211 and the second setting unit 212, or include both the first setting unit 211 and the second setting unit 212.

Figure 3:
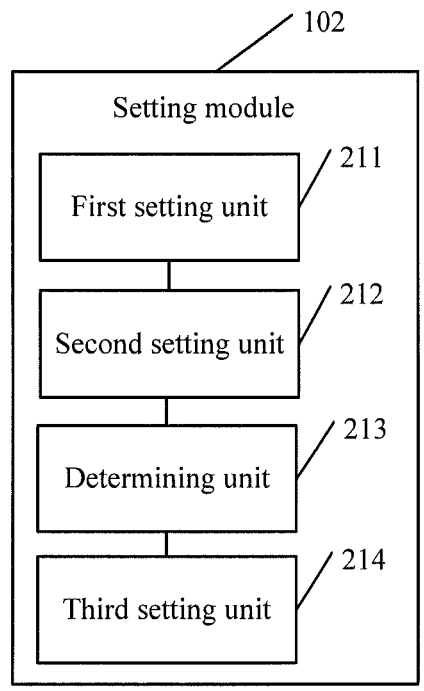
FIG. 3 is a schematic structural diagram of another embodiment of a setting module shown in FIG. 1 according to the present invention.

Referring to FIG. 3, FIG. 3 is a schematic structural diagram of another embodiment of the setting module shown in FIG. 1. In this embodiment, the setting module 102 may include the first setting unit 211 and/or the second setting unit 212. The setting module 102 may further include a determining unit 213 and a third setting unit 214.

The determining unit 213 is adapted to: if the obtaining module 101 obtains configuration information again, compare a configuration parameter for uplink power calculation of the Scell in the obtained configuration information with a configuration parameter for uplink power calculation of the Scell in last obtained configuration information, and determine whether the configuration parameter for uplink power calculation is changed.

As described above, the configuration information may include a power control parameter of the Scell; where the power control parameter of the Scell may include: a PUSCH configuration parameter $P_{O\_UE\_PUSCH}$ and/or a PUCCH configuration parameter $P_{O\_UE\_PUCCH}$ for uplink power calculation. The determining unit 211 compares the currently obtained $P_{O\_UE\_PUSCH}$ with the last obtained $P_{O\_UE\_PUSCH'}$ to determine whether there is a change; and/or the determining unit 211 compares the currently obtained $P_{O\_UE\_PUCCH}$ with the last obtained $P_{O\_UE\_PUCCH'}$, to determine whether there is a change.

The third setting unit 214 is adapted to: when the determining unit 213 determines that the configuration parameter for uplink power calculation is changed, set a PUSCH initial power adjustment value $f_c(0)$ of the Scell with the changed configuration parameter for uplink power calculation to 0, and/or set a PUCCH initial power adjustment value $g_c(0)$ of the Scell with the changed configuration parameter for uplink power calculation to 0.

If the determining unit 214 determines that the $P_{O\_UE\_PUSCH}$ is changed, it indicates that the eNodeB carries out new configuration on the PUSCH of the Scell, and the third setting unit 214 sets the $f_c(0)$ to 0. If the determining module 213 determines that the $P_{O\_UE\_PUCCH}$ is changed, it indicates that the eNodeB carries out new configuration on the PUCCH of the Scell, and the third setting unit 214 sets the $g_c(0)$ to 0. If the determining unit 214 determines that both the $P_{O\_UE\_PUSCH}$ and the $P_{O\_UE\_PUCCH}$ are changed, it indicates that the eNodeB carries out new configuration on both the PUSCH and the PUCCH of the Scell, and the third setting unit 214 sets the $f_c(0)$ to 0 and sets the $g_c(0)$ to 0.

If the determining module 213 determines that the $P_{O\_UE\_PUSCH}$ is unchanged, it indicates that the eNodeB carries out no new configuration on the PUSCH of the Scell, and the third setting unit 214 does not process the PUSCH of the Scell, and the PUSCH initial power adjustment value remains unchanged. If the determining module 213 determines that the $P_{O\_UE\_PUCCH}$ is unchanged, it indicates that the eNodeB carries out no new configuration on the PUCCH of the Scell, and the third setting unit 214 does not process the PUCCH of the Scell, and the PUCCH initial power adjustment value remains unchanged. If the determining module 213 determines that both the $P_{O\_UE\_PUSCH}$ and the $P_{O\_UE\_PUCCH}$ are unchanged, the third setting unit 214 does not process the PUCCH and the PUSCH initial power adjustment value of the Scell, and both the PUSCH and PUCCH initial power adjustment values of the Scell remain unchanged.

Figure 4:
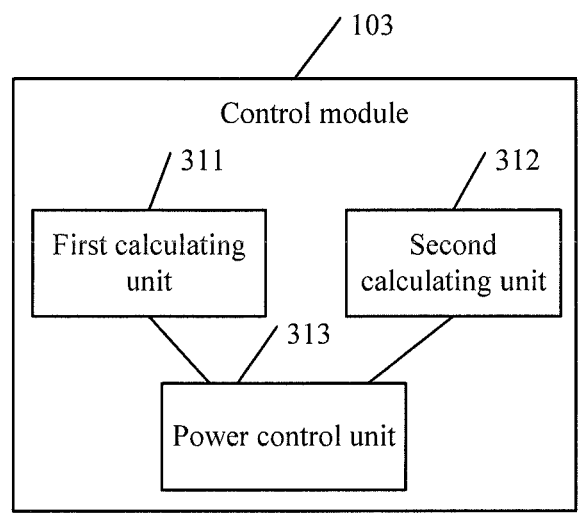
FIG. 4 is a schematic structural diagram of an embodiment of a control module shown in FIG. 1 according to an embodiment of the present invention.

Referring to FIG. 4, FIG. 4 is a schematic structural diagram of an embodiment of the control module shown in FIG. 1. The control module 103 includes a first calculating unit 311, a second calculating unit 312, and a power control unit 313.

The first calculating unit 311 is adapted to calculate, according to the $f_c(0)$ of the Scell set by the setting module 102 and based on a PUSCH transmit power calculation formula, a PUSCH transmit power value of the UE on the Scell.

The PUSCH transmit power calculation formula is:

$$P_{PUSCH,c}(i) = \min \begin{cases} 10\log_{10}(\hat{P}_{CMAX,c}(i) - \hat{P}_{PUCCH}(i)), \\ 10\log_{10}(M_{PUSCH,c}(i)) + P_{O\_PUSCH,c}(j) + \alpha_c(j) \cdot PL_c + \Delta_{TF,c}(i) + f_c(i) \end{cases}.$$

In the above formula:

i represents a subframe (subframe);

$P_{CMAX,c}(i)$ represents configured maximum transmit power of the UE on the current carrier;

$M_{PUSCH,c}(i)$ represents a bandwidth of resource assignment that can be obtained by the PUSCH on subframe i, and is expressed by using valid resource blocks (resource block);

$P_{O\_PUSCH,c}(j)$ represents a PUSCH adjustment power value. $P_{O\_NOMINAL\_PUSCH,c}(j) = P_{O\_UE\_PUSCH,c}(j) + P_{O\_PUSCH,c}(j)$. If the current subframe uses SPS grants (Semi Persistent Scheduling grant, semi persistent scheduling grant) to perform new transmission and retransmission, j=0; if the current subframe uses dynamic scheduled grants (dynamic scheduling grant) to perform new transmission and retransmission, j=1; and if the current subframe uses RAR grants (grant) to perform new transmission and retransmission, j=2. If j=0 or j=1, the $P_{O\_NOMINAL\_PUSCH,c}(j)$ and the $P_{O\_UE\_PUSCH,c}(j)$ are indicated by the eNode; and if j=2, $P_{O\_UE\_PUSCH,c}(2)=0$, and $P_{O\_NOMINAL\_PUSCH,c}(2) = P_{O\_PRE} + \Delta_{PREAMBLE\_Msg3}$, where preamble adjustment power of both the $P_{O\_PRE}$ (refers to preamble received expected power) and the $\Delta_{PREAMBLE\_Msg3}$ (relative to Msg3 (may be called message 3) are indicated by the eNodeB. The $P_{O\_NOMINAL\_PUSCH,c}(j)$ is a PUSCH configuration parameter for uplink power calculation from a system message, and the $P_{O\_NOMINAL\_PUSCH,c}(j)$ is a PUSCH configuration parameter for uplink power calculation from a dedicated configuration message;

$\Delta_{TF,c}(i)$ is a power adjustment value related to the current transmission format;

$\alpha_c(j) \cdot PL_c$ is a path loss compensation; and $f_c(i)$ is a power adjustment value related to the initial power adjustment value (first value) and the TPC Command. For the accumulation mode, $f_c(i) = f_c(i-1) + \delta_{PUSCH,c}(i - K_{PUSCH})$ and for the absolute mode, $f_c(i) = \delta_{PUSCH,c}(i - K_{PUSCH})$, where the $\delta_{PUSCH,c}(i - K_{PUSCH})$ is a TPC Command sent on the $i - K_{PUSCH}$ subframe, where $K_{PUSCH}$ is a configurable value.

The second calculating unit 312 is adapted to calculate, according to the $g_c(0)$ of the Scell set by the setting module 102 and based on a PUCCH transmit power calculation formula, a PUCCH transmit power value of the UE on the Scell.

The PUCCH transmit power calculation formula is:

$$P_{PUCCH}(i) = \min \begin{cases} P_{CMAX,c}(i), \\ P_{O\_PUCCH} + PL_c + h(n_{CQI}, n_{HARQ}, n_{SR}) + \Delta_{F\_PUCCH}(F) + \\ \Delta_{T \times D}(F') + g(i) \end{cases}.$$

In the above formula:

i represents a subframe (subframe);

$P_{CMAX,c}(i)$ represents configured maximum transmit power of the UE on the current carrier;

$P_{O\_PUCCH}$ represents a PUCCH adjustment power value; and $P_{O\_PUCCH} = P_{O\_NOMINAL\_PUCCH} + P_{O\_UE\_PUCCH}$, where $P_{O\_NOMINAL\_PUCCH}$ is a PUCCH configuration parameter for uplink power calculation from the system message, and $P_{O\_UE\_PUCCH}$ is a PUCCH configuration parameter for uplink power calculation from the dedicated configuration message;

$PL_c$ is a path loss;

h(n) is a value corresponding to a different PUCCH transmission format;

$\Delta_{F\_PUCCH}(F)$ is a power adjustment value indicated by the eNodeB;

$\Delta_{TxD}(F')$ is a setting of the number of transmit antenna ports; and $g_c(i)$ is a power adjustment state of the current PUCCH, that is, a PUCCH initial power adjustment value. For the accumulation mode, $$g_c(i) = g_c(i-1) + \sum_{m=0}^{M-1} \delta_{PUCCH}(i - k_m),$$

and for the absolute mode, $$g_c(i) = \sum_{m=0}^{M-1} \delta_{PUCCH}(i - k_m),$$

where both M and $k_m$ are configurable values.

The power control unit 313 is adapted to control PUSCH and/or PUCCH uplink transmit power of the UE on the Scell according to the transmit power values obtained through calculation by the first calculating unit 311 and the second calculating unit 312. The power control unit 312 may set the PUSCH and/or the PUCCH uplink transmit power of the UE on the Scell according to the transmit power values obtained through calculation by the first calculating unit 311 and the second calculating unit 312, and control uplink data and/or uplink signaling to be transmitted at the transmit power, thereby implementing transmission of data and/or signaling over the air interface.

The UE in the embodiment of the present invention sets an initial power adjustment value of an Scell according to configuration information delivered by a base station, and controls transmit power of the UE on the Scell according to the set initial power adjustment value of the Scell. Because the initial power adjustment value of the Scell is set based on a configuration parameter directly delivered by the base station instead of being simply set to 0, the UE can still obtain appropriate transmit power even in a situation where a difference between channel states of a Pcell and an Scell is large, thereby ensuring accuracy of data transmission.

An embodiment of a base station provided by the present invention will be described in detail hereinafter with reference to FIG. 5 and FIG. 6.

Figure 5:
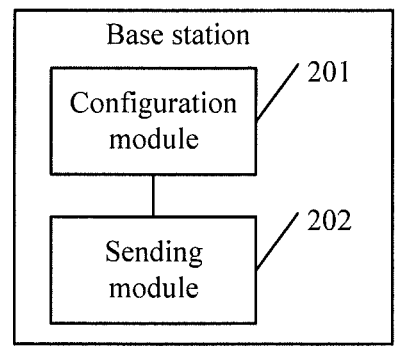
FIG. 5 is a schematic structural diagram of an embodiment of a base station according to the present invention.

Referring to FIG. 5, FIG. 5 is a schematic structural diagram of an embodiment of a base station according to the present invention. The base station includes a configuration module 201 and a sending module 202.

The configuration module 201 is adapted to configure at least one Scell for a UE that is connected to the base station.

An eNodeB may configure measurement configuration for a UE connected to the eNodeB through a dedicated configuration message, for example, RRC Connection Reconfiguration, or through a system message, for example, cell information, carrier information, neighboring cell information, and neighboring carrier information, or through a combined message of the dedicated configuration message and the system message. The UE measures network configuration information of one or more Scells according to the measurement configuration, where the network configuration information includes information such as path loss (Path Loss, PL), reference signal received power (Reference Signaling Reception Power, RSRP), reference signal received quality (Reference Signaling Reception Quality, RSRQ), and downlink timing (Downlink Timing). The UE reports a measurement result to the eNodeB, and the configuration module 201 may configure at least one Scell for the UE according to the measurement result reported by the UE.

The UE may also start an active measurement mechanism. For example, the UE discovers an Scell, begins to actively measure radio channel quality of the Scell, and reports a measurement result to the eNodeB. The configuration module 201 may also configure at least one Scell for the UE according to the measurement result actively reported by the UE.

The eNodeB itself stores information of multiple Scells, which may include band information of the Scells, network configuration information of the Scells, and radio channel quality of the Scells. The configuration module 201 may further configure at least one Scell for the UE according to the Scell information stored by the eNodeB.

The sending module 202 is adapted to deliver configuration information to the UE, where the configuration information includes a configuration parameter of the at least one Scell configured by the configuration module, so that the UE sets an initial power adjustment value of the Scell according to the configuration parameter of the at least one Scell.

The configuration information may include the configuration parameter of the at least one Scell configured by the configuration module 201. The sending module 202 may deliver the configuration information to the UE through a dedicated configuration message and/or a system message, so that the UE sets the initial power adjustment value of the Scell according to the configuration parameter of the at least one Scell in the configuration information, and controls transmit power of uplink data and/or uplink signaling on the Scell according to the initial power adjustment value of the Scell, thereby implementing transmission of data and/or signaling over the air interface.

Figure 6:
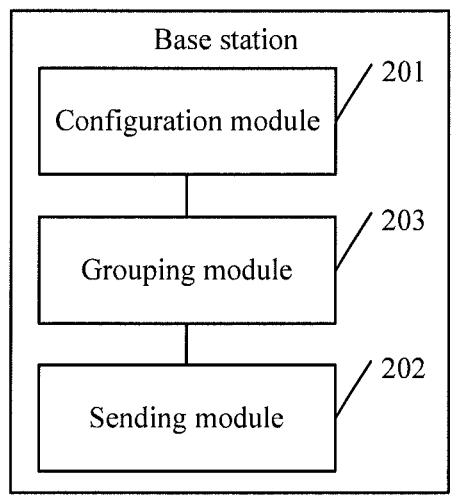
FIG. 6 is a schematic structural diagram of another embodiment of a base station according to the present invention.

Referring to FIG. 6, FIG. 6 is a schematic structural diagram of another embodiment of a base station according to the present invention. Corresponding to the base station in the embodiment shown in FIG. 6, the base station in this embodiment also includes a configuration module 201 and a sending module 202, and in this embodiment, the base station further includes:

a grouping module 203, adapted to group the at least one Scell.

The grouping module 203 may group the at least one Scell according to a specific rule, for example, group Scells of same band information into one Scell group; or group Scells sharing a same timing advance into one Scell group; or group Scells sharing same network configuration information into one Scell group. After the grouping module 203 performs grouping, the configuration information delivered by the sending module 202 to the UE may further include grouping information of the at least one Scell configured by the eNodeB for the UE.

The base station in the embodiment of the present invention delivers configuration information to the UE, so that the UE sets an initial power adjustment value of an Scell according to the configuration information and controls transmit power of the UE on the Scell. Because the initial power adjustment value of the Scell is set based on a configuration parameter directly delivered by the base station instead of being simply set to 0, the UE can still obtain appropriate transmit power even in a situation where a difference between channel states of a Pcell and an Scell is large, thereby ensuring accuracy of data transmission.

Corresponding to any one of the UEs provided in FIG. 1 to FIG. 4 and any one of the base stations provided in FIG. 5 and FIG. 6 according to the embodiments of the present invention, a power control method provided by an embodiment of the present invention will be described in detail hereinafter with reference to FIG. 7 to FIG. 9. All the UEs and base stations provided by the foregoing embodiments of the present invention can be applied to the following power control method provided by the embodiment of the present invention.

Figure 7:
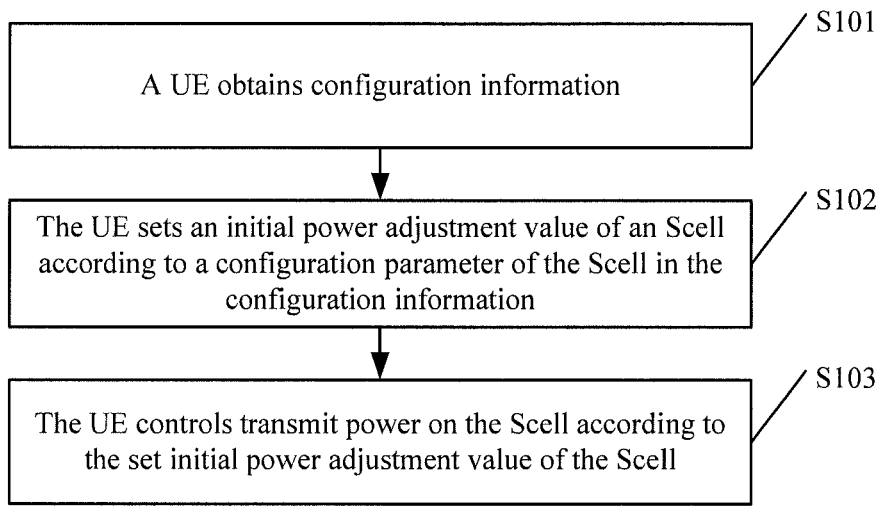
FIG. 7 is a flowchart of an embodiment of a power control method according to the present invention.

Referring to FIG. 7, FIG. 7 is a flowchart of an embodiment of a power control method according to the present invention. The method includes:

S101: A UE obtains configuration information.

In step S101, the UE may obtain the configuration information by parsing a dedicated configuration message, for example, an RRC Connection Reconfiguration message, delivered by the eNodeB; or obtain the configuration information by parsing a system message, for example, cell information, carrier information, neighboring cell information, and neighboring carrier information, delivered by the eNodeB; or obtain the configuration information by parsing a dedicated configuration message and a system message delivered by the eNodeB. Reference may be made to the prior art for a process where the UE parses the dedicated configuration message and/or the system message, and details will not be described herein again.

S102: The UE sets an initial power adjustment value of an Scell according to a configuration parameter of the Scell in the configuration information.

When a difference between channel states of a Pcell and an Scell is large, in order to ensure accuracy of power control over the UE, it is necessary to set a PUSCH initial power adjustment value $f_c(0)$ and/or a PUCCH initial power adjustment value $g_c(0)$ of the Scell according to the configuration parameter of the Scell in the obtained configuration information. It should be noted that, in step S102, the UE sets the initial power adjustment value of at least one Scell configured by the eNodeB, which may be interpreted as that the UE may set initial power adjustment values of all or a part of Scells configured by the eNodeB. In a practical application, the UE may set the initial power adjustment value by selecting a corresponding Scell according to an activation management command delivered by the eNodeB, where the activation management command may include any one or more of an activation command, an RA instruction, a deactivation command, a deactivation timer, and a synchronization timer. For example, if the eNodeB delivers an activation command, to instruct the UE to activate all the Scells configured by the eNodeB for the UE, the UE may set initial power adjustment values of all the Scells configured by the eNodeB according to the activation command. For another example, if the eNodeB delivers an activation command, to instruct the UE to activate a part of the Scells configured by the eNodeB for the UE, the UE may set initial power adjustment values of a part of the Scells configured by the eNodeB according to the activation command. For yet another example, if the eNodeB delivers an activation command, to instruct the UE to activate all the Scells configured by the eNodeB for the UE, the UE may set initial power adjustment values by selecting itself all or a part of the Scells configured by the eNodeB. For still another example, if the eNodeB delivers an activation command, to instruct the UE to activate a part of the Scells configured by the eNodeB, the UE may set initial power adjustment values for all or a part of the Scells, which are configured by the eNodeB and selected by the UE itself.

S103: The UE controls transmit power on the Scell according to the set initial power adjustment value of the Scell.

After the $f_c(0)$ and/or $g_c(0)$ is set, in step S103, the UE may substitute the $f_c(0)$ into a PUSCH transmit power calculation formula, to obtain through calculation a PUSCH transmit power value of the UE on the Scell; and substitute the $g_c(0)$ into a PUCCH transmit power calculation formula, to obtain through calculation a PUCCH transmit power value of the UE on the Scell. The UE may set PUSCH and/or PUCCH uplink transmit power of the UE on the Scell based on the transmit power values obtained through calculation, and control uplink data and/or uplink signaling to be transmitted at the transmit power, thereby implementing transmission of data and/or signaling over the air interface.

Figure 8:
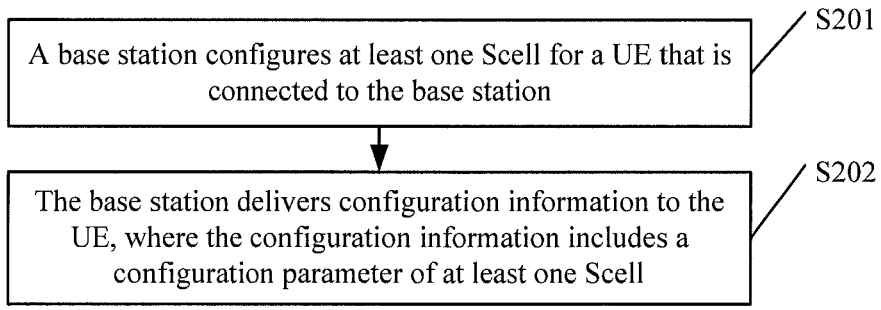
FIG. 8 is a flowchart of another embodiment of a power control method according to the present invention.

Referring to FIG. 8, FIG. 8 is a flowchart of another embodiment of a power control method according to the present invention. The method includes:

S201: A base station configures at least one Scell for a UE that is connected to the base station.

An eNodeB may configure measurement configuration for a UE connected to the eNodeB through a dedicated configuration message, for example, RRC Connection Reconfiguration, or through a system message, for example, cell information, carrier information, neighboring cell information, neighboring carrier information, or through a combined message of a dedicated configuration message and a system message. The UE measures network configuration information of one or more Scells according to the measurement configuration, where the network configuration information includes information such as PL, RSRP, RSRQ, and Downlink Timing. The UE reports a measurement result to the eNodeB, and in step S201, the eNodeB may configure at least one Scell for the UE according to the measurement result reported by the UE.

The UE may also start an active measurement mechanism. For example, the UE discovers an Scell, begins to actively measure radio channel quality of the Scell, and reports a measurement result to the eNodeB. In step S201, the eNodeB may also configure at least one Scell for the UE according to the measurement result actively reported by the UE.

The eNodeB itself stores information of multiple Scells, which may include band information of the Scells, network configuration information of the Scells, and radio channel quality of the Scells. In step S201, the eNodeB may also configure at least one Scell for the UE according to the Scell information stored by itself.

S202: The base station delivers configuration information to the UE, where the configuration information includes a configuration parameter of the at least one Scell configured by the eNodeB, so that the UE sets an initial power adjustment value of the Scell according to the configuration parameter of the at least one Scell.

In step S202, the eNodeB may deliver the configuration information to the UE through a dedicated configuration message and/or a system message, so that the UE sets the initial power adjustment value of the Scell according to the configuration parameter of the at least one Scell in the configuration information, and controls transmit power of uplink data and/or uplink signaling on the Scell according to the initial power adjustment value of the Scell, thereby implementing transmission of data and/or signaling over the air interface.

Figure 9:
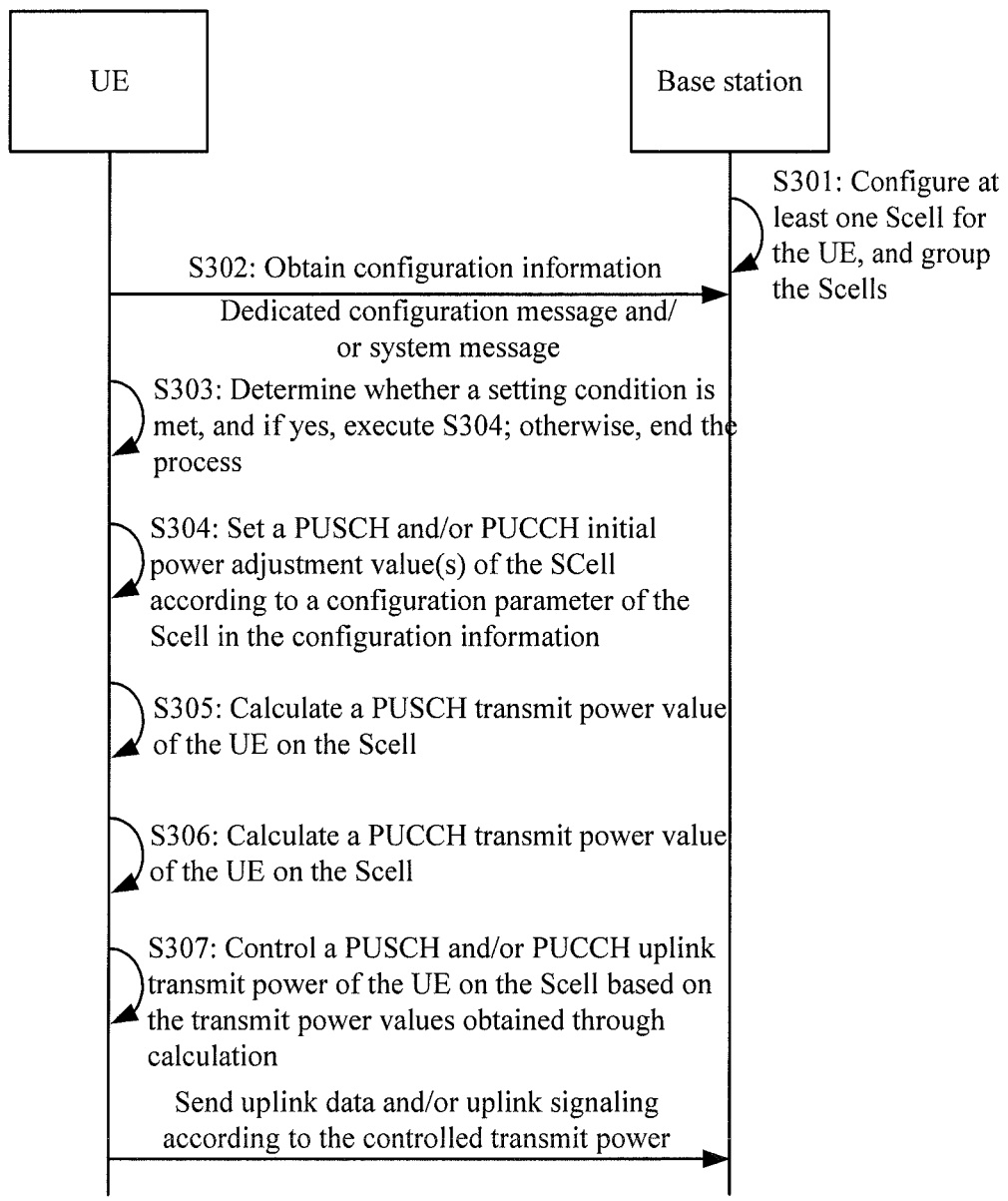
FIG. 9 is a flowchart of another embodiment of a power control method according to the present invention.

Referring to FIG. 9, FIG. 9 is a flowchart of another embodiment of a power control method according to the present invention. The method includes:

S301: A base station configures at least one Scell for a UE that is connected to the base station, and groups the at least one Scell.

In step S301, reference may be made to step S201 in the embodiment shown in FIG. 8 for a process where the eNodeB configures the Scells for the UE. After configuring at least one Scell for the UE, the eNodeB may further group the at least one Scell according to a specific rule, for example, group Scells of same band information into one Scell group; or group Scells sharing a same timing advance into one Scell group; or group Scells sharing same network configuration information into one Scell group.

S302: The UE obtains configuration information.

Reference may be made to Step S101 in the embodiment shown in FIG. 7 for step S302 in this embodiment, and details will not be described herein again.

S303: The UE determines whether a setting condition is met; if a determination result is yes, execute step S304; and otherwise, end the process.

The setting condition may be any one or more of the following conditions: any one Scell in the Scell group is activated, where the Scell being activated includes: a downlink carrier of the Scell and/or an uplink carrier of the Scell is activated; an RA initiated by the UE on any one SRCell in one Scell group is successful; the UE receives an RAR (Random Access Respond, random access respond) message for an RA initiated by the UE on any one SRCell in one Scell group; and the UE is in an RA process initiated by the UE on any one SRCell in one Scell group before a first message is sent. The first message may be a Msg3 message in the RA process, where the Msg3 message is data sent by the UE in response to the RAR message by using resources carried by the RAR message.

S304: The UE sets a PUSCH and/or PUCCH initial power adjustment value(s) of the Scell according to the configuration parameter of the Scell in the configuration information.

In step S304, a setting process of the UE may be as follows: if the UE initiates an RA on any one SRCell in one Scell group, for the SRCell where the RA is initiated in the Scell group, the UE sets the PUSCH initial power adjustment value of the SRCell to $f_c(0)=\Delta P_{rampup}+\delta_{msg2}$; and/or sets the PUCCH initial power adjustment value of the SRCell to $g_c(0)=\Delta P_{rampup}+\delta_{msg2}$; and for an Scell where no RA is initiated in the Scell group, the UE sets the PUSCH initial power adjustment value $f_c(0)$ of the Scell to 0; and/or sets the PUCCH initial power adjustment value $g_c(0)$ of the Scell to 0. The Scell where no RA is initiated in the Scell group may include an SRCell and an SOCell where no RA is initiated in the Scell group.

Further, if the UE obtains configuration information again, the setting process of the UE may be as follows: the UE further firstly compares a configuration parameter for uplink power calculation of the Scell in the currently obtained configuration information with a configuration parameter for uplink power calculation of the Scell in last obtained configuration information, and determines whether the configuration parameter for uplink power calculation is changed. As described above, the configuration information may include a power control parameter of the Scell; where the power control parameter of the Scell includes: configuration parameter $P_{O\_UE\_PUSCH}$ and/or $P_{O\_UE\_PUCCH}$ for uplink power calculation. The UE compares the currently obtained $P_{O\_UE\_PUSCH}$ with the last obtained $P_{O\_UE\_PUSCH}$ to determine whether there is a change; and/or compares the currently obtained $P_{O\_UE\_PUCCH}$ with the last obtained $P_{O\_UE\_PUCCH}$ to determine whether there is a change.

If it is determined that $P_{O\_UE\_PUSCH}$ is changed, it indicates that the eNodeB carries out new configuration on the PUSCH of the Scell, and the UE sets the $f_c(0)$ to 0. If it is determined that $P_{O\_UE\_PUCCH}$ is changed, it indicates that the eNodeB carries out new configuration on the PUCCH of the Scell, and the UE sets the $g_c(0)$ to 0. If it is determined that both $P_{O\_UE\_PUSCH}$ and $P_{O\_UE\_PUCCH}$ are changed, it indicates that the eNodeB carries out new configuration on both the PUSCH and the PUCCH of the Scell, and the UE sets the $f_c(0)$ to 0, and further sets the $g_c(0)$ to 0.

If it is determined that $P_{O\_UE\_PUSCH}$ is unchanged, it indicates that the eNodeB carries out no new configuration on the PUSCH of the Scell, the UE does not process the PUSCH of the Scell, and the PUSCH initial power adjustment value remains unchanged. If it is determined that $P_{O\_UE\_PUCCH}$ is unchanged, it indicates that the eNodeB carries out no new configuration on the PUCCH of the Scell, the UE does not process the PUCCH of the Scell, and the PUCCH initial power adjustment value remains unchanged. If it is determined that both $P_{O\_UE\_PUSCH}$ and $P_{O\_UE\_PUCCH}$ are unchanged, the UE does not process the PUSCH or the PUCCH of the Scell, and both the PUSCH and PUCCH initial power adjustment values of the Scell remain unchanged.

Step S304 in this embodiment may be a specific step of step S102 in the embodiment shown in FIG. 7.

S305: The UE calculates a PUSCH transmit power value of the UE on the Scell according to the set PUSCH initial power adjustment value.

In step S305, the UE may substitute the set $f_c(0)$ into a PUSCH transmit power calculation formula, to obtain through calculation the PUSCH transmit power value of the UE on the Scell. The PUSCH transmit power calculation formula is:

$$P_{PUSCH,c}(i) = \min \begin{cases} 10\log_{10}(\hat{P}_{CMAX,c}(i) - \hat{P}_{PUCCH}(i)), \\ 10\log_{10}(M_{PUSCH,c}(i)) + P_{O\_PUSCH,c}(j) + \alpha_c(j) \cdot PL_c + \Delta_{TF,c}(i) + f_c(i) \end{cases}.$$

S306: The UE calculates the PUCCH transmit power value of the UE on the Scell according to the set PUCCH initial power adjustment value.

In step S306, the UE may substitute the set $g_c(0)$ into a PUCCH transmit power calculation formula, to obtain through calculation the PUCCH transmit power value of the UE on the Scell. The PUCCH transmit power calculation formula is:

$$P_{PUCCH}(i) = \min \left\{ \begin{array}{l} P_{CMAX,c}(i), \\ P_{O\_PUCCH} + PL_c + h(n_{CQI}, n_{HARQ}, n_{SR}) + \Delta_{F\_PUCCH}(F) + \\ \Delta_{T \times D}(F') + g(i) \end{array} \right\}.$$

S307: The UE controls, according to the transmit power values obtained through calculation, the PUSCH and/or the PUCCH transmit power of the UE on the Scell.

In step S307, the UE may set, based on the transmit power values obtained through calculation in step S205 and step S206, the PUSCH and/or the PUCCH uplink transmit power of the UE on the Scell, and control uplink data and/or uplink signaling to be transmitted at the transmit power, thereby implementing transmission of data and/or signaling over the air interface.

Step S305 to step S307 in this embodiment may be a specific process of step S103 in the embodiment shown in FIG. 7.

In this embodiment, step S305 and step S306 may be executed in no particular order. For example, step S306 may also be executed first, and then step S305 is executed; or step S305 and step S306 are executed concurrently. This embodiment may also include only one of step S305 and step S306. For example, if the configuration information delivered by the eNodeB only includes a PUSCH adjustment parameter for uplink power calculation of the Scell, the UE only sets the PUSCH initial power adjustment value $f_c(0)$ of the Scell. In this case, this embodiment only includes step S305. For another example, if the configuration information delivered by the eNodeB only includes a PUCCH adjustment parameter for uplink power calculation of the Scell, the UE only sets the PUCCH initial power adjustment value $g_c(0)$ of the Scell. In this case, the embodiment of the present invention only includes step S306.

The UE in the embodiment of the present invention sets an initial power adjustment value of an Scell according to the configuration information delivered by the base station, and controls transmit power of the UE on the Scell according to the set initial power adjustment value of the Scell. Because the initial power adjustment value of the Scell is set based on the configuration parameter directly delivered by the base station instead of being simply set to 0, the UE can still obtain appropriate transmit power even in a situation where a difference between channel states of a Pcell and an Scell is large, thereby ensuring accuracy of data transmission.

In the solution provided by the embodiments of the present invention, after delivering the configuration information to the UE that is connected to the base station, the base station may perform activation management for the at least one Scell. After obtaining the configuration information delivered by the base station, the UE may perform activation processing for the at least one Scell. If the configuration information includes grouping information of the at least one Scell, where the grouping information is used to indicate that the at least one Scell is subordinate to at least one Scell group, the base station may perform activation management for the Scells in the at least one Scell group, and the UE may perform activation processing for the Scells in the at least Scell group.

The base station may deliver an activation management command to the UE, so that the UE cooperates with the base station to perform activation management for the at least one Scell or at least one Scell in the at least one Scell group. The UE executes activation processing for the at least one Scell or Scells in the at least one Scell group according to the activation management command delivered by the base station. The activation management command may include any one or more of an activation command, an RA instruction, a deactivation command, a deactivation timer, and a synchronization timer.

Another embodiment of a UE according to the present invention will be described in detail hereinafter with reference to FIG. 10.

Figure 10:
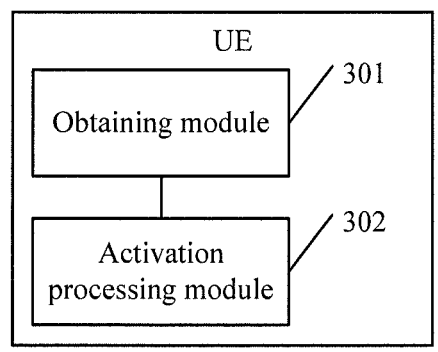
FIG. 10 is a schematic structural diagram of another embodiment of a UE according to the present invention.

Referring to FIG. 10, FIG. 10 is a schematic structural diagram of another embodiment of a UE according to the present invention. The UE includes an obtaining module 301 and an activation processing module 302.

The obtaining module 301 is adapted to obtain configuration information.

The configuration information may include a configuration parameter of at least one Scell configured by a base station for the UE. Reference may be made to the obtaining process of the obtaining module 101 in any one of the embodiments shown in FIG. 1 to FIG. 4 for an obtaining process of the obtaining module 301 in this embodiment, and details will not be described herein again.

The activation processing module 302 is adapted to perform activation processing for the at least one Scell according to an activation management command delivered by the base station.

If the configuration information includes grouping information of the at least one Scell, where the grouping information is used to indicate that the at least one Scell is subordinate to at least one Scell group, the activation processing module 302 performs activation processing for Scells in the Scell group according to the activation management command delivered by the base station.

The UE in the embodiment of the present invention can execute activation processing for an Scell configured by the base station or Scells in an Scell group according to an activation management command delivered by the base station, and cooperate with the base station to implement activation management for the at least one Scell configured by the base station.

Another embodiment of a base station according to the present invention will be described in detail hereinafter with reference to FIG. 11.

Figure 11:
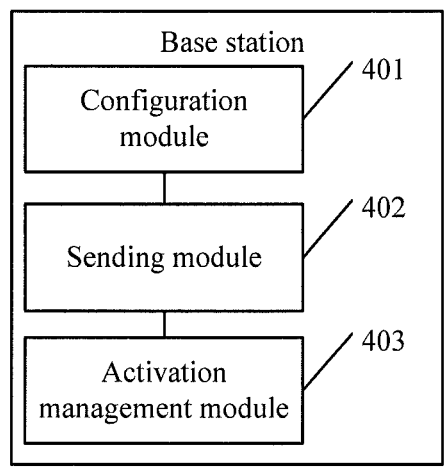
FIG. 11 is a schematic structural diagram of another embodiment of a base station according to the present invention.

Referring to FIG. 11, FIG. 11 is a schematic structural diagram of another embodiment of a base station according to the present invention. The base station includes a configuration module 401, a sending module 402, and an activation management module 403.

The configuration module 401 is adapted to configure at least one Scell for a UE that is connected to the base station.

Reference may be made to the configuring process of the configuration module 201 in any one of the embodiments shown in FIG. 5 and FIG. 6 for a configuring process of the configuration module 401 in this embodiment, and details will not be described herein again.

The sending module 402 is adapted to deliver configuration information to the UE, where the configuration information includes a configuration parameter of the at least one Scell configured by the configuration module.

Reference may be made to the sending process of the sending module 202 in any one of the embodiments shown in FIG. 5-FIG. 6 for a sending process of the sending module 402 in this embodiment, and details will not be described herein again.

The activation management module 403 is adapted to perform activation management for the at least one Scell.

If the configuration information includes grouping information of the at least one Scell, where the grouping information is used to indicate that the at least one Scell is subordinate to at least one Scell group, the activation management module 403 performs activation management for Scells in the Scell group. The activation management module 403 may deliver an activation management command to the UE, so that the UE executes activation processing for the Scell or Scells in the Scell group according to the activation management command, thereby implementing activation management. Reference may be made to the prior art for a process where the activation management module 403 delivers an activation management command (for example, an activation command and a deactivation command), and details will not be described herein again.

The base station in the embodiment of the present invention delivers the activation management command to the UE, so that the UE executes activation processing for an Scell configured by the base station or Scells in an Scell group, and cooperates with the base station to implement activation management for the at least one Scell configured by the base station.

Corresponding to the UE provided in FIG. 10 and the base station provided in FIG. 11 according to the embodiments of the present invention, an activation management method provided by an embodiment of the present invention will be described in detail hereinafter with reference to FIG. 12 and FIG. 13. Both the foregoing UE and base station can be applied to the following activation management method provided by the embodiment of the present invention.

Figure 12:
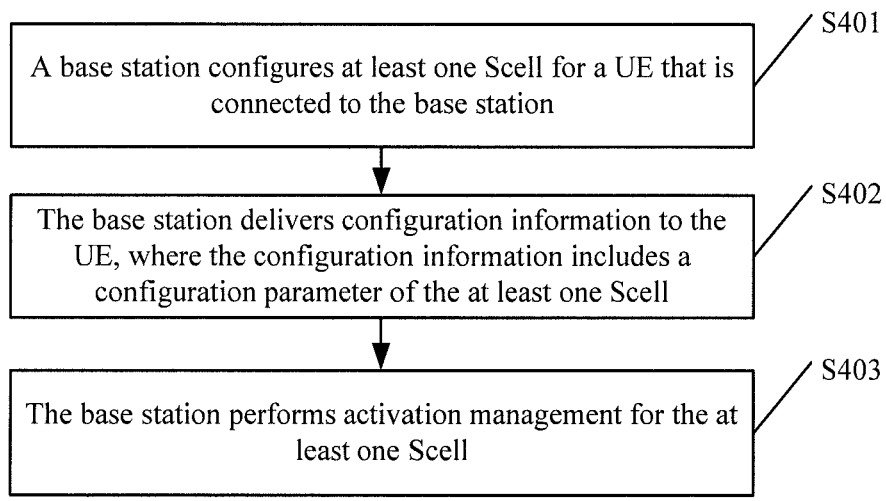
FIG. 12 is a flowchart of an embodiment of an activation management method according to the present invention.

Referring to FIG. 12, FIG. 12 is a flowchart of an embodiment of an activation management method according to the present invention. The method includes:

S401: A base station configures at least one Scell for a UE that is connected to the base station.

Reference may be made to step S201 shown in FIG. 8 for step S401 in this embodiment, and details will not be described herein again.

S402: The base station delivers configuration information to the UE, where the configuration information includes a configuration parameter of the at least one Scell.

Reference may be made to step S202 shown in FIG. 8 for step S401 in this embodiment, and details will not be described herein again.

S403: The base station performs activation management for the at least one Scell.

If the configuration information includes grouping information of the at least one Scell, where the grouping information is used to indicate that the at least one Scell is subordinate to at least one Scell group, in step S403, the base station may perform activation management for Scells in the Scell group. For example, the base station may deliver an activation management command to the UE, so that the UE executes activation processing for the Scell or Scells in the Scell group according to the activation management command, thereby implementing activation management.

If the at least one Scell configured by the base station for the UE is subordinate to at least one Scell group, the process in step S403 in this embodiment that the base station performs activation management for Scells in the Scell group will be described in detail hereinafter.

(1) The performing, by the base station, activation management for Scells in the Scell group may include:

the base station sends an activation command to the UE, where the activation command may be used to instruct the UE to activate a downlink carrier and/or an uplink carrier of an SRCell that needs activation in the Scell group, to enable the SRCell to enter an activated state.

The activation command is further used to instruct the UE to activate downlink carriers and/or uplink carriers of other Scells that need activation in the Scell group at the same time when the SRCell enters the activated state or after a preset time of delay, to enable the other Scells to enter the activated state, where the other Scells may be at least one Scell that needs activation except the SRCell that needs activation in the Scell group.

If the uplink carrier of the SRCell is activated to enable the SRCell to enter the activated state, the performing, by the base station, activation management for Scells in the Scell group may also include:

The base station sends an RA instruction to the UE, to instruct the UE to initiate an RA on the uplink carrier of the SRCell. At the same time when the RA is successful or after a preset time of delay, or at the same time when the UE receives an RAR message in the RA process or after a preset time of delay, the SRCell enters a synchronized state; and at the same time when the SRCell enters the synchronized state or after a preset time of delay, the other Scells enter the synchronized state.

The preset time may be set according to an actual time required for the Scell to perform activation preparation. The preset time for each Scell may be the same or different. Optionally, the preset time for each Scell in one Scell group may be the same. An order of magnitude of the preset time may be in ms. For example, the preset time may be 6 ms, or the preset time may be 8 ms.

(2) The performing, by the base station, activation management for Scells in the Scell group may also include:

the base station sends a deactivation command to the UE, to instruct the UE to deactivate an SRCell that needs deactivation in the Scell group, and instruct the UE to perform deactivation for other Scells that need deactivation in the Scell group at the same time when the SRCell is deactivated or after a preset time of delay;

where the other Scells are at least one Scell that needs deactivation except the SRCell in the Scell group.

(3) The performing, by the base station, activation management for Scells in the Scell group may also include:

the base station configures a deactivation timer for each Scell group, or the base station configures deactivation timers respectively for all SRCells and all SOCells in each Scell group, or, the base station configures a deactivation timer for each Scell in each Scell group, so that the UE performs activation processing for Scells in the Scell group according to the deactivation timer.

(4) The performing, by the base station, activation management for Scells in the Scell group may also include:

the base station configures a synchronization timer for each Scell group; or the base station configures a synchronization timer for all SRCells in each Scell group; or the base station configures a synchronization timer for each SRCell in each Scell group, so that the UE performs activation processing for Scells in the Scell group according to the synchronization timer.

It should be noted that, reference may be made to the activation management process for Scells in an Scell group for activation management of the base station for a single Scell.

The base station in the embodiment of the present invention delivers an activation management command to the UE, so that the UE executes activation processing for an Scell configured by the base station or Scells in an Scell group, and cooperates with the base station to implement activation management for the at least one Scell configured by the base station.

Figure 13:
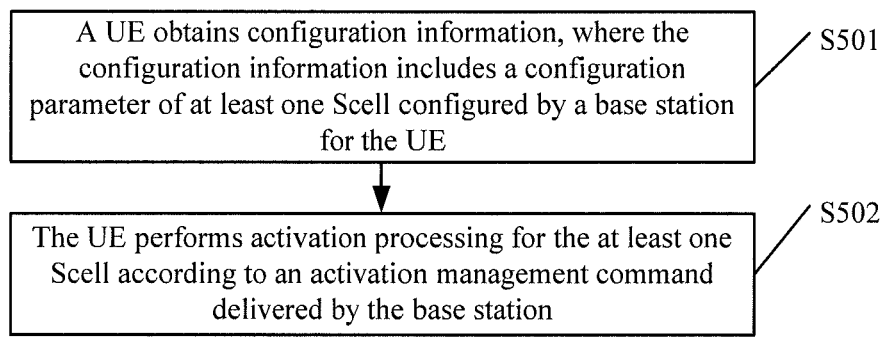
FIG. 13 is a flowchart of another embodiment of an activation management method according to the present invention.

Referring to FIG. 13, FIG. 13 is a flowchart of another embodiment of an activation management method according to the present invention. The method includes:

S501: A UE obtains configuration information, where the configuration information includes a configuration parameter of at least one Scell configured by a base station for the UE.

Reference may be made to step S101 shown in FIG. 7 for step S501 in this embodiment, and details will not be described herein again.

S502: The UE performs activation processing for the at least one Scell according to an activation management command delivered by the base station.

If the configuration information includes grouping information of the at least one Scell, where the grouping information is used to indicate that the at least one Scell is subordinate to at least one Scell group, in step S502, the UE performs activation processing for Scells in the Scell group according to the activation management command delivered by the base station.

If the at least one Scell configured by the base station for the UE is subordinate to at least one Scell group, the process in step S502 in this embodiment that the UE performs activation processing for Scells in the Scell group according to the activation management command delivered by the base station will be described in detail hereinafter.

(1) The performing, by the UE, activation processing for Scells in the Scell group according to the activation management command delivered by the base station may include:

the UE activates, according to an activation command delivered by the base station, a downlink carrier and/or an uplink carrier of an SRCell that needs activation in the Scell group, and the SRCell enters an activated state.

If the activation command further instructs the UE to activate downlink carriers and/or uplink carriers of other Scells that need activation in the Scell group at the same time when the SRCell enters the activated state or after a preset time of delay to enable the other Scells to enter the activated state, the performing, by the UE, activation processing for Scells in the Scell group according to the activation management command delivered by the base station may further include:

The UE activates, according to the activation command delivered by the base station, downlink carriers and/or uplink carriers of other Scells that need activation in the Scell group at the same time when the SRCell enters the activated state or after a preset time of delay, and the other Scells enter the activated state; where other Scells are at least one Scell that needs activation except the SRCell that enters the activated state in the Scell group.

If the UE activates an uplink carrier of the SRCell that needs activation in the Scell group, and the SRCell enters the activated state, the performing, by the UE, activation processing for Scells in the Scell group according to the activation management command delivered by the base station may further include:

the UE initiates an RA on an uplink carrier of the SRCell according to an RA instruction delivered by the base station. At the same time when the RA is successful or after a preset time of delay, or at the same time when the UE receives an RAR message in the RA process or after a preset time of delay, the SRCell enters a synchronized state; and at the same time when the SRCell enters the synchronized state or after a preset time of delay, the other Scells enter the synchronized state.

The initiating, by the UE, an RA on the uplink carrier of the SRCell according to an RA instruction delivered by the base station specifically includes:

if the SRCell is subordinate to at least one Scell group, the UE selects one SRCell from each Scell group according to the RA instruction delivered by the base station, and initiates an RA on the selected SRCells according to a preset sequence; or, the UE selects one SRCell from each Scell group according to the RA instruction, and initiates an RA on the selected SRCells.

The preset sequence may include any one of an identity sequence of the Scell groups, a configuration sequence of the Scell groups, an identity sequence of the selected SRCells, a configuration sequence of the selected SRCells, and a channel quality sequence of the selected SRCells.

(2) The performing, by the UE, activation processing for Scells in the Scell group according to the activation management command delivered by the base station may also include:

the UE deactivates, according to the deactivation command delivered by the base station, an SRCell that needs deactivation in the Scell group, and at the same time when the SRCell is deactivated or after a preset time of delay, performs deactivation for other Scells that need deactivation in the Scell group;

where the other Scells are at least one Scell that needs deactivation except the SRCell in the Scell group.

(3) If the base station configures a deactivation timer for each Scell group, the performing, by the UE, activation processing for Scells in the Scell group according to the activation management command delivered by the base station may also include:

if it is detected that a deactivation timer configured by the base station for any one Scell group expires, the UE deactivates Scells in the Scell group corresponding to the expired deactivation timer immediately or after a preset time of delay; and the UE re-starts the deactivation timer corresponding to the Scell group when the UE receives resource allocation on any one Scell of any one Scell group.

(4) If the base station configures a deactivation timer for each SRCell and each SOCell in each Scell group, the performing, by the UE, activation processing for Scells in the Scell group according to the activation management command delivered by the base station may also include:

if it is detected that a deactivation timer configured by the base station for all SRCells in any one Scell group expires, the UE deactivates the SRCells in the Scell group corresponding to the expired deactivation timer immediately or after a preset time of delay;

if it is detected that a deactivation timer configured by the base station for all SOCells in any one Scell group expires, the UE deactivates the SOCells in the Scell group corresponding to the expired deactivation timer immediately or after a preset time of delay;

when the UE receives resource allocation on any one SRCell in each Scell group, the UE re-starts the deactivation timer corresponding to the SRCell; and when the UE receives resource allocation on any one SOCell in each Scell group, the UE re-starts the deactivation timer corresponding to the SOCell.

(5) If the base station configures a deactivation timer for each Scell in each Scell group, the performing, by the UE, activation processing for Scells in the Scell group according to the activation management command delivered by the base station may also include:

if it is detected that a deactivation timer configured by the base station for any one Scell in any one Scell group expires, the UE deactivates the Scell corresponding to the expired deactivation timer immediately or after a preset time of delay; and when the UE receives resource allocation on any one Scell in each Scell group, the UE re-starts the deactivation timer corresponding to the Scell.

(6) If the base station configures a synchronization timer for each Scell group, the performing, by the UE, activation processing for Scells in the Scell group according to the activation management command delivered by the base station may also include:

if it is detected that a synchronization timer configured by the base station for any one Scell group expires, Scells in the Scell group corresponding to the expired synchronization timer enter an out-of-synchronization state immediately or after a preset time of delay; and when the UE receives a timing advance command sent by the base station, the UE re-starts the synchronization timer corresponding to the Scell group.

(7) If the base station configures a synchronization timer for all SRCells in each Scell group, the performing, by the UE, activation processing for Scells in the Scell group according to the activation management command delivered by the base station may also include:

if it is detected that a synchronization timer configured by the base station for all SRCells in any one Scell group expires, the SRCells in the Scell group corresponding to the expired synchronization timer enter an out-of-synchronization state immediately or after a preset time of delay, and the SOCells in the Scell group enter an out-of-synchronization state at the same time when the SRCells enter the out-of-synchronization state or after a preset time of delay; and when the UE receives a timing advance command sent by the base station, the UE re-starts the synchronization timer corresponding to the SRCells in the Scell group.

(8) If the base station configures a synchronization timer for each SRCell in each Scell group, the performing, by the UE, activation processing for Scells in the Scell group according to the activation management command delivered by the base station may further include:

if it is detected that a synchronization timer configured by the base station for any one SRCell in any one Scell group expires, the SRCell corresponding to the expired synchronization timer enters an out-of-synchronization state immediately or after a preset time of delay; and when the UE receives a timing advance command sent by the base station, the UE re-starts the synchronization timer corresponding to the SRCell.

It should be noted that, reference may be made to the process of activation processing for Scells in an Scell group for the activation processing of the UE for a single Scell. In the above (1)-(8), the preset time may be set according to an actual time required for the Scell to perform activation preparation. The preset time for each Scell may be the same or different. Optionally, the preset time for each Scell in one Scell group may be the same. An order of magnitude of the preset time may be in ms. For example, the preset time may be 6 ms, or the preset time may be 8 ms.

The UE in the embodiment of the present invention can execute activation processing for an Scell configured by the base station or Scells in an Scell group according to an activation management command delivered by the base station, and cooperate with the base station to implement activation management for the at least one Scell configured by the base station.

A person of ordinary skill in the art may understand that all or a part of the processes of the methods in the foregoing embodiments may be implemented by a computer program instructing relevant hardware. The program may be stored in a computer readable storage medium. When the program runs, the processes of the methods in the embodiments are performed. The storage medium may be a magnetic disk, an optical disc, a read-only memory (Read-Only Memory, ROM), or a random access memory (Random Access Memory, RAM).

The foregoing description are merely exemplary embodiments of the present invention and definitely are not intended to limit the scope of the claims of the present invention, a person of ordinary skill in the art can understand that all or a part of the procedures for implementing the embodiments, and equivalent changes made according to the claims of the present invention still fall within the scope of the present invention.

What is claimed is:

1. A power control method, comprising:

obtaining, by a user equipment (UE), first configuration information, wherein the first configuration information comprises a configuration parameter of at least one secondary carrier(Scell) configured by a base station for the UE;

setting, by the UE, an initial power adjustment value of the at least one Scell according to the configuration parameter of the at least one Scell in the first configuration information when the UE receives a random access response (RAR) message; and controlling, by the UE, transmit power on the at least one Scell according to the initial power adjustment value of the at least one Scell;

wherein the at least one Scell comprises a secondary access carrier, a configuration parameter of the secondary access carrier comprises random access (RA) configuration information, the RA configuration information comprises any one or more of physical random access channel (PRACH) configuration information, preamble initial received target power, preamble format information, and an RA power ramping operation;

wherein the RAR message is used to respond to an RA initiated by the UE on any one secondary access carrier in an Scell group;

wherein the setting, by the UE, an initial power adjustment value of the at least one Scell according to the configuration parameter of the at least one Scell in the first configuration information comprises:

when the UE initiates the RA on the any one secondary access carrier in the Scell group, setting, by the UE, an uplink data channel initial power adjustment value of the secondary access carrier where the RA is initiated in the Scell group to $f_c(0) = \Delta P_{rampup} + \delta_{msg2}$;

wherein $f_c(0)$ is the uplink data channel initial power adjustment value of the secondary access carrier where the RA is initiated in the Scell group; $\Delta P_{rampup}$ is a total power ramping value of the UE that is obtained according to the RA configuration information of the secondary access carrier in an RA process; and $\delta_{msg2}$ is a power adjustment value represented by a transmit power control (TPC) command comprised in the RAR message received by the UE from the base station in the RA process.

2. The method according to claim 1, wherein the configuration parameter of the secondary access carrier further comprises a power control parameter, the power control parameter comprises a configuration parameter for uplink power calculation.

3. The method according to claim 1, wherein the setting, by the UE, the initial power adjustment value of the at least one Scell according to the configuration parameter of the at least one Scell in the first configuration information further comprises:
when the UE initiates the RA on the any one secondary access carrier in the Scell group, setting, by the UE, the uplink data channel initial power adjustment value $f_c(0)$ of the Scell where no RA is initiated in the Scell group to 0.

4. An apparatus, comprising:
a receiver to obtain first configuration information, wherein the first configuration information comprises a configuration parameter of at least one secondary carrier (Scell) configured by a base station for a user equipment (UE); and
a processor to set an initial power adjustment value of the at least one Scell according to the configuration parameter of the at least one Scell in the first configuration information when the UE receives a random access response (RAR) message; and
the processor further to control transmit power of the UE on the at least one Scell according to the initial power adjustment value of the at least one Scell;
wherein the at least one Scell comprises a secondary access carrier, a configuration parameter of the secondary access carrier comprises random access (RA) configuration information, the RA configuration information comprises any one or more of physical random access channel (PRACH) configuration information, preamble initial received target power, preamble format information, and an RA power ramping operation;
wherein the RAR message is used to respond to an RA initiated by the UE on any one secondary access carrier in an Scell group;
wherein the processor to set an initial power adjustment value of the at least one Scell according to the configuration parameter of the at least one Scell in the first configuration information comprises:
when the UE initiates the RA on the any one secondary access carrier in the Scell group, the processor to set an uplink data channel initial power adjustment value of the secondary access carrier where the RA is initiated in the Scell group to $f_c(0)=\Delta P_{rampup}+\delta_{msg2}$;
wherein $f_c(0)$ is the uplink data channel initial power adjustment value of the secondary access carrier where the RA is initiated in the Scell group; $\Delta P_{rampup}$ is a total power ramping value of the UE that is obtained according to the RA configuration information of the secondary access carrier in an RA process; and $\delta_{msg2}$ is a power adjustment value represented by a transmit power control (TPC) command comprised in the RAR message received by the UE from the base station in the RA process.

5. The apparatus according to claim 4, wherein
the configuration parameter of the secondary access carrier comprises a power control parameter,
the power control parameter comprises a configuration parameter for uplink power calculation.

6. The apparatus according to claim 4, wherein the processor to set the initial power adjustment value of the at least one Scell according to the configuration parameter of the at least one Scell in the first configuration information further comprises:
when the UE initiates the RA on the any one secondary access carrier in the Scell group, the processor to set the uplink data channel initial power adjustment value $f_c(0)$ of the Scell where no RA is initiated in the Scell group to 0.

7. A non-transitory computer-readable storage medium comprising instructions which, when executed by a processor included in user equipment (UE), cause the UE to execute operations comprising:
obtaining first configuration information, wherein the first configuration information comprises a configuration parameter of at least one secondary carrier (Scell) configured by a base station for the UE;
setting an initial power adjustment value of the at least one Scell according to the configuration parameter of the at least one Scell in the first configuration information when the UE receives a random access response (RAR) message; and
controlling transmit power on the at least one Scell according to the initial power adjustment value of the at least one Scell;
wherein the at least one Scell comprises a secondary access carrier, a configuration parameter of the secondary access carrier comprises random access (RA) configuration information, the RA configuration information comprises any one or more of physical random access channel (PRACH) configuration information, preamble initial received target power, preamble format information, and an RA power ramping operation;
wherein the RAR message is used to respond to an RA initiated by the UE on any one secondary access carrier in an Scell group;
wherein the setting an initial power adjustment value of the at least one Scell according to the configuration parameter of the at least one Scell in the first configuration information comprises:
when the UE initiates the RA on the any one secondary access carrier in the Scell group, setting an uplink data channel initial power adjustment value of the secondary access carrier where the RA is initiated in the Scell group to $f_c(0)=\Delta P_{rampup}+\delta_{msg2}$;
wherein $f_c(0)$ is the uplink data channel initial power adjustment value of the secondary access carrier where the RA is initiated in the Scell group; $\Delta P_{rampup}$ is a total power ramping value of the UE that is obtained according to the RA configuration information of the secondary access carrier in an RA process; and $\delta_{msg2}$ is a power adjustment value represented by a transmit power control (TPC) command comprised in the RAR message received by the UE from the base station in the RA process.

* * * * *